UNITED STATES PATENT OFFICE.

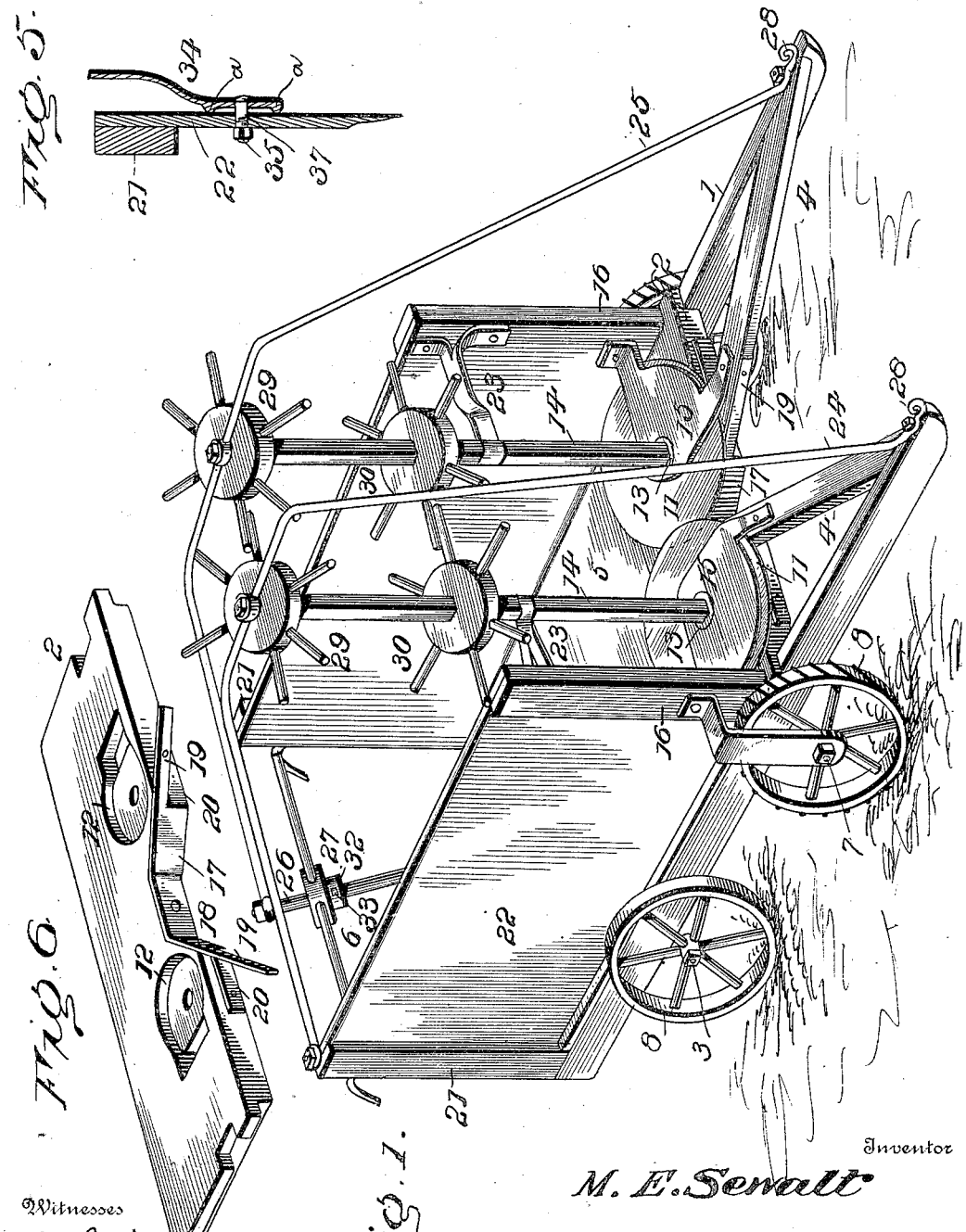

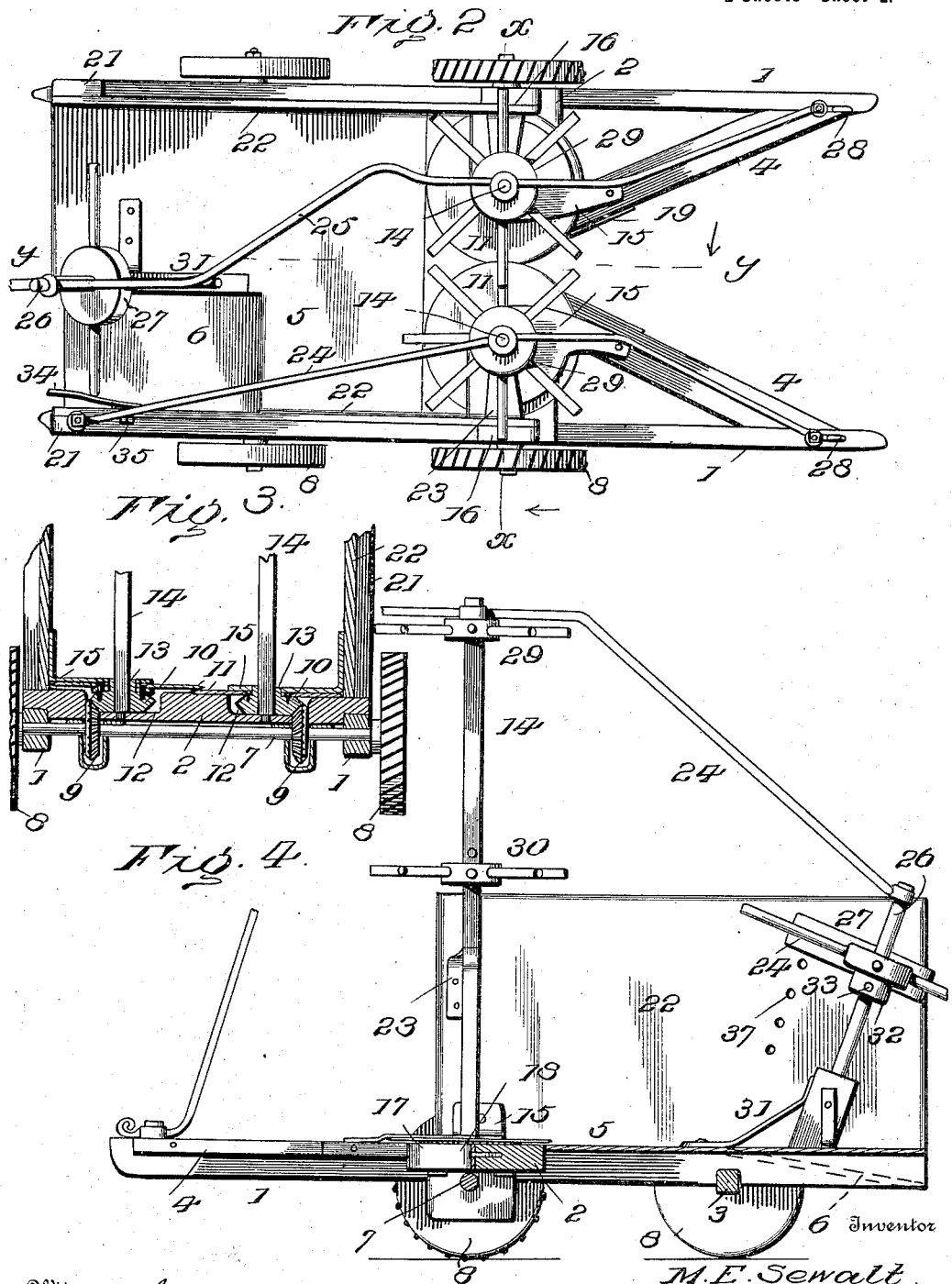

MATTHEW E. SEWALT, OF LIGHT, TEXAS.

CORN-HARVESTER.

SPECIFICATION forming part of Letters Patent No. 688,704, dated December 10, 1901.

Application filed April 3, 1901. Serial No. 54,211. (No model.)

*To all whom it may concern:*

Be it known that I, MATTHEW E. SEWALT, a citizen of the United States, residing at Light, in the county of Scurry and State of Texas, have invented certain new and useful Improvements in Corn-Harvesters; and I do hereby declare the following to be a full, clear, and exact description of the invention, such as will enable others skilled in the art to which it appertains to make and use the same.

This invention relates to agricultural machinery of the variety for use in harvesting crops such as corn and cane, the purpose being to provide a machine of this type of simple, durable, and compact construction and which will be light running and not fatigue the team, since the body or frame supporting the operating parts is balanced upon the ground or supporting wheels.

For a full description of the invention and the merits thereof and also to acquire a knowledge of the details of construction of the means for effecting the result reference is to be had to the following description and drawings hereto attached.

While the essential and characteristic features of the invention are necessarily susceptible of modification, still the preferred embodiment of the invention is illustrated in the accompanying drawings, in which—

Figure 1 is a perspective view of a corn-harvester embodying the invention. Fig. 2 is a top plan view. Fig. 3 is a transverse section about on the line X X of Fig. 2. Fig. 4 is a longitudinal section about on the line Y Y of Fig. 2 looking in the direction of the arrow. Fig. 5 is a detail view of the spring-retainer for the rear reel, showing more clearly the means for varying the tension thereof with reference to the said reel. Fig. 6 is a detail view of the front end portion of the platform, showing the reinforcing strap-iron.

Corresponding and like parts are referred to in the following description and indicated in all the views of the drawings by the same reference characters.

The body of the implement comprises longitudinal sills 1, a transverse plate 2, connecting the sills intermediate of their ends, an axle 3, and forwardly-divergent bars 4, connected at their rear ends to the plate 2 and at their front ends to the sills 1. These bars 4 brace the structure and constitute guards to direct the stalks to the cutting apparatus. Boards are secured to the rear end portions of the longitudinal sills and form a platform 5 in the rear of the transverse plate 2, the top of the platform being flush with the upper side of the said plate 2. A rear corner portion of the platform is depressed, as shown at 6, and inclines rearwardly and downwardly to facilitate the discharge of the stalks. A retainer is located at one side of the depressed portion 6 and serves to arrest the discharge of the stalks until a bunch of determined size is formed. This retainer is in the shape of a reel, and one of its arms normally extends over the depressed portion 6, so as to obstruct the passage of the stalks until the required pressure is brought to bear upon the restraining means of the retainer. This part of the machine will be described more in detail hereinafter.

An axle 7 is journaled in bearings applied to the longitudinal sills 1 and is located beneath the plate 2 and is provided with ground-wheels 8, which constitute drivers and which are provided on their edges with cogs or ribs to prevent slipping and insure rotation of the axle 7 as the machine is drawn over the ground. Gear-wheels 9 are secured to opposite end portions of the axle 7, so as to turn therewith and mesh with corresponding gear-wheels 10, to which the rotary cutters 11 are attached, so as to impart rotation thereto. The gear-wheels 9 are housed to prevent their catching the stalks or other growth and becoming choked thereby. The gear-wheels 10 are fitted in recesses 12, formed in the top side of the transverse plate 2, and are formed with hubs 13, having angular openings in which are stepped the lower ends of vertical shafts 14, carrying upper and lower reels. The cutters 11 are secured to the top side of the gear-wheel 10 and overlap the recesses 12, in which the gear-wheels 10 are seated, so as to exclude foreign matter which would have a tendency to interfere with the free rotation of the cutters and the gear-wheels 10, carrying the same. Quadrant-shaped plates 15 are located above the cutters 11 and are pierced to receive the hubs 13, for which they constitute bearings, and these plates are secured to the bars 4 and adjacent uprights 16.

The vertical shafts 14 pass through the hubs 13, and their lower ends obtain bearings in the transverse plate 2 and constitute lower journals for the gear-wheels 10, the hubs 13 forming upper bearings in the plates 15. The inner edge portions of the cutters 11 overlap and move rearwardly as the machine advances. The transverse plate 2 is notched or cut away in its front edge opposite the space formed between the divergent bars 4 to provide ample clearance for the inner cutting edges of the cutters 11. A strap-iron 17 reinforces the notch or cut away-portion 18, and its end portions are split longitudinally for a short distance to form parts 19 and 20, the parts 19 being attached to the inner ends of the bars 4 and the parts 20 being secured to the front edge of the plate 2 upon opposite sides of the notch or cut-away part 18. It will thus be seen that that strap-iron in addition to reinforcing the notch 18 strengthens the connection of the bars 4 with the plate 2.

Uprights or standards 16 are located at the front corners of the platform, and corresponding uprights 21 are located at the rear corners, and these uprights are rigidly attached at their lower ends to the sills 1 and support side pieces 22, which inclose the sides of the platform and prevent the stalks from falling laterally therefrom. Brackets 23 are secured to the upper ends of the standards 16, and their horizontal arms constitute bearings at their inner ends for the vertical reel-shafts 14. Rods or bars 24 and 25 are attached at one end to the front ends of the sills 1 and extend upward at an inward and rearward inclination, thence project rearwardly in a horizontal direction, and thence rearwardly and downwardly, the rod 24 being attached to the upper end of the standard 21, adjacent the depressed portion 6 of the platform, and the rod 25 being attached at its rear end to the upper end of a shaft 26, upon which the rear reel 27 or retainer is rotatably mounted. The intermediate horizontal portions of the rods or bars 24 and 25 are provided with a bearing in which the upper ends of the respective reel-shafts 14 are journaled. These parts 24 and 25 brace the reel-shafts and form guards between which the stalks pass from one end of the machine to the other. The front ends of the rods are formed into hooks, as shown at 28, to which the draft is applied. The rear portions of the rods 24 and 25 gradually diverge, so as to compress the stalks at their upper ends.

The reel-shafts 14, as hereinbefore stated, are journaled at their upper and lower ends and intermediate of their ends and are provided with coöperating reels 29 and 30, which receive the stalks between them and by means of which said stalks are moved rearward over the platform in a positive manner. The inner arms of the reels overlap, as clearly indicated in the drawings. Hence the stalks are positively grasped and carried rearward. The reels 29 and 30 being in different horizontal planes engage with the stalks at different levels, and hence hold the said stalks in an upright position, which is essential to the formation of neat and compact bunches.

The retainer is located at the rear end of the platform and at one side of the depressed portion 6 and comprises a shaft 26, which inclines rearwardly at its upper end, and a reel 27, mounted for rotation upon the said shaft, said reel having by preference four arms of such relative length and disposition that one of the said arms extends over the depressed part 6 and the next arm in order projects longitudinally, so as to prevent lateral displacement of the stalks at their lower or butt ends. The shaft 26 is braced by stays 31 and the rod or bar 25. The reel 27 is vertically adjustable upon the shaft 26 and is adapted to turn freely thereon, so as to admit of an automatic discharge of the stalks when a sufficient number have accumulated to form a bunch of required size. This reel is supported at the desired elevation by means of an adjustable stop 32, which consists of a collar mounted upon the shaft 26 and secured thereto at the required elevation by means of a binding-screw 33, threaded into an opening formed laterally in the said collar. The restraining means for the reel consists of a spring 34, which is attached to the side 22, adjacent the depressed portion 6 of the platform. This spring projects inward at its rear end and is adapted to engage an arm of the reel 27 and retard its movement until the tension of the spring 34 is overcome by the pressure of the stalks upon the reel, when the latter will turn and admit of the automatic discharge of the bunch, the next arm of the reel being engaged by the spring 34 and held until a sufficient number of stalks accumulate upon the depressed portion 6 of the platform to again effect a partial rotation of the reel. The restraining device or spring 34 has adjustable connection with its supporting side 22, being shifted upon the same to the required elevation. The fastening-bolt 35 for the spring 34 is adapted to pass through one of a series of openings 37, formed in the side piece 22, so as to hold the spring in the required position. The series of openings 37 incline to correspond with the inclination of the shaft 26, and this is essential in order to admit of the spring engaging an arm of the reel alike at every point of its adjustment. The tension of the spring 34 is adapted to be varied so as to offer a greater or less resistance to the rotation of the reel, thereby allowing for the formation of shocks or bunches of desired size. When a small bunch is required, the tension of the spring 34 is lessened, and when a large bunch is required to be discharged the tension of the spring 34 is increased. Any means may be resorted to for causing the spring to engage an arm of the reel with greater or less force, and, as shown, spaced lugs *a* are provided at the inner end of the spring upon the side adjacent the side piece 22 to which the spring is attached. The fastening-bolt 35 passes through the spring at a point between the lugs a and can be tightened more or less to press the part of a spring between the lugs inward to throw the outer or rear end of the spring away from the proximal side piece 22 to a greater or less distance, as required, thereby attaining the desired end.

In practice the machine is drawn over the field in such a manner as to receive a row of stalks between the forwardly-divergent bars 4, and these stalks are severed by the cutters 11 and are passed rearwardly upon the platform by means of the reels 29 and 30, and their rearward movement is arrested by an arm of the retainer or reel 27. When a sufficient number of stalks have accumulated to form a bunch of required size, the pressure of the bunch upon the obstructing arm of the reel 27 overcomes the tension or restraining action of the spring 34, and the reel is released and makes a turn sufficient to admit of the automatic discharge of the bunch, the deposition of the stalks upon the ground being facilitated by the rearward inclination of the depressed portion of the platform. The operator stands upon that portion of the platform at one side of the rear portion of the bars or guards 24 and 25, as will be readily understood.

Having thus described the invention, what is claimed as new is—

1. In a machine for harvesting corn and the like, a plate having recesses or depressions in its top side, gear-wheels seated in said recesses and having hubs upon their upper sides, an axle provided with gear-wheels in meshing relation with the aforementioned gear-wheels, rotary cutters secured to the horizontal gear-wheels, plates extending over the cutters and forming bearings for the hubs of the horizontal gear-wheels, and vertical reels stepped in the horizontal gear-wheels and having their lower ends journaled in the plate supporting the said horizontal gear-wheels, substantially as set forth.

2. In a corn-harvester, longitudinal sills, a transverse plate having a notch or cut-away portion in its front edge medially of its ends, forwardly-divergent bars, a reinforcing and strengthening iron secured to the notch of the transverse plate and having its end portions longitudinally split and secured to, respectively, the front edge of the said transverse plate and the inner ends of the divergent bars, and cutting apparatus having the coöperating edge portions opposite the aforesaid notched portion of the transverse plate, substantially as set forth.

3. In a corn-harvester, an upright shaft at the delivery end of the platform, a reel adjustable upon said shaft, and a vertically-adjustable restraining means for retarding the rotation of the said reel, substantially as set forth.

4. In a corn-harvester, a platform having its delivery portion depressed and rearwardly and downwardly inclined, a rearwardly and upwardly inclined shaft at one side of the said depressed portion, a reel vertically adjustable upon said shaft, and a restraining means for retarding rotation of the reel and vertically adjustable upon a line inclined to correspond with the inclination of the reel-shaft, substantially as set forth.

In testimony whereof I affix my signature in presence of two witnesses.

MATTHEW E. SEWALT. [L. S.]

Witnesses:
O. L. MCMAHAN,
H. H. COTTEN.